US008914616B2

(12) United States Patent
Craske (10) Patent No.: US 8,914,616 B2
(45) Date of Patent: Dec. 16, 2014

(54) EXCHANGING PHYSICAL TO LOGICAL REGISTER MAPPING FOR OBFUSCATION PURPOSE WHEN INSTRUCTION OF NO OPERATIONAL IMPACT IS EXECUTED

(75) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 420 days.

(21) Appl. No.: 13/309,739

(22) Filed: Dec. 2, 2011

(65) Prior Publication Data

US 2013/0145129 A1    Jun. 6, 2013

(51) Int. Cl.
*G06F 9/38* (2006.01)
*G06F 9/34* (2006.01)
*G06F 21/14* (2013.01)

(52) U.S. Cl.
CPC . *G06F 9/384* (2013.01); *G06F 9/34* (2013.01); *G06F 21/14* (2013.01)
USPC .................. 712/216; 712/217; 712/E9.023

(58) Field of Classification Search
None
See application file for complete search history.

(56) References Cited

U.S. PATENT DOCUMENTS

| | | | |
|---|---|---|---|
| 5,664,215 A | 9/1997 | Burgess et al. | |
| 5,867,684 A | 2/1999 | Kahle et al. | |
| 6,035,391 A * | 3/2000 | Isaman | 712/222 |
| 6,560,671 B1 * | 5/2003 | Samra et al. | 711/108 |
| 2005/0010527 A1 | 1/2005 | Rarick et al. | |
| 2006/0107268 A1 | 5/2006 | Chrabieh | |
| 2007/0192573 A1 * | 8/2007 | Savransky et al. | 712/222 |
| 2012/0191956 A1 * | 7/2012 | Fleischman | 712/222 |

FOREIGN PATENT DOCUMENTS

| | | |
|---|---|---|
| EP | 0 495 162 | 7/1992 |
| WO | WO 02/054228 | 7/2002 |

OTHER PUBLICATIONS

J. Irwin et al., "Instruction Stream Mutation for Non-Deterministic Processors", *IEEE Computer Society*, 2002, 10 pages.
International Search Report and Written Opinion of the International Searching Authority mailed Jan. 22, 2013 in PCT/GB2012/052455.
International Search Report and Written Opinion of the International Searching Authority mailed Jan. 23, 2013 in PCT/GB2012/052469.
D. May et al, "Random Register Renaming to Foil DPA" Cryptographic Hardware and Embedded Systems, vol. 2162, May 2001, pp. 28-38.
Y. Lu et al, "Lightweight DPA Resistant Solution on FPGA to Counteract Power Models" International Conference on Field-Programmable Technology (FPT), Dec. 2010, pp. 178-183.

(Continued)

*Primary Examiner* — Kenneth Kim
(74) *Attorney, Agent, or Firm* — Nixon & Vanderhye P.C.

(57) ABSTRACT

A data processing apparatus and method are provided. A processor performs data processing operations in response to data processing instructions which reference logical registers. A set of physical registers stores data values which are subjected to the data processing operations. A tag storage stores for each physical register a tag value indicative of one of the logical registers. The processor references the tag storage to perform the data processing operations. A tag value exchanger performs a tag switch exchanging two tag values in the tag storage when the processor executes a predetermined instruction which references two logical registers and for which a choice of which two physical registers are mapped to which of the two logical registers will have no effect on an outcome of the data processing operations. The tag value exchanger performs the tag switch with respect to the tag values indicative of the two logical registers.

17 Claims, 8 Drawing Sheets

(56) References Cited

OTHER PUBLICATIONS

U.S. Appl. No. 13/309,719, filed Dec. 2, 2011, Brelot et al.
Office Action mailed Apr. 9, 2014 in co-pending U.S. Appl. No. 13/309,719.
J.L. Hennessy et al, "Computer Architecture A Quantitative Approach" 2003, Morgan Kaufmann Third Edition, Back Cover, 4 pages.
J.P. Shen et al, "Modern Processor Design" Fundamentals of Superscalar Processors, 2005, McGraw Hill $1^{st}$ edition, pp. 242-244.
International Preliminary Report on Patentability dated Jun. 12, 2014 in PCT/GB2012/052469, 7 pages.
Final Office Action mailed Aug. 5, 2014 in co-pending U.S. Appl. No. 13/309,719, 25 pages.

* cited by examiner

FIG. 1

```
void INITIALIZE(void)
{
    int index;

for(index = 0; index < NUM_REGS; index++)
    {
        TAG[index] = index;
    }
}
```

FIG. 2A

```
int LOOKUP(int RegName)
{
    int index;

for(index = 0; index < NUM_REGS; index++)
    {
       if(TAG[index] == RegName) return index;
    }

ASSERT_NEVER; // One will always match.
}
```

FIG. 2B

ADD Rd,Rn,Rm

```
REG[LOOKUP(Rd)] <= REG[LOOKUP(Rn)] + REG[LOOKUP(Rm)]
```

FIG. 3A

MOV Rd,Rn

```
REG[LOOKUP(Rd)] <= REG[LOOKUP(Rn)]
TAG[LOOKUP(Rd)] <= Rn
TAG[LOOKUP(Rn)] <= Rd
```

MOV PC,Rn

```
PC <= REG[LOOKUP(Rn)]
```

MOV Rd,SP

```
REG[LOOKUP(Rd)] <= SP
```

FIG. 6A

LDM Rn,{Rt1,Rt2,Rt3}

```
REG[LOOKUP(Rt2)] <= MEMORY
TAG[LOOKUP(Rt2)] <= Rt1
TAG[LOOKUP(Rt1)] <= Rt2
```
```
REG[LOOKUP(Rt3)] <= MEMORY
TAG[LOOKUP(Rt3)] <= Rt2
TAG[LOOKUP(Rt2)] <= Rt3
```
```
REG[LOOKUP(Rt3)] <= MEMORY
```

FIG. 6B

```
always @ (posedge clk) begin
    TAG[alpha] <= TAG[beta];
    TAG[beta]  <= TAG[alpha];
end
```

FIG. 7A

```
always @ (posedge clk) begin
    if(TAG[0] == Rd) REG[0] <= value;
    if(TAG[1] == Rd) REG[1] <= value;
    ...
    if(TAG[N] == Rd) REG[N] <= value;
end
```

FIG. 7B

```
wire [31:0] value =
    {32{TAG[0] == Rn}} & REG[0] |
    {32{TAG[1] == Rn}} & REG[1] |
    ...
    {32{TAG[N] == Rn}} & REG[N];
```

EXCHANGING PHYSICAL TO LOGICAL REGISTER MAPPING FOR OBFUSCATION PURPOSE WHEN INSTRUCTION OF NO OPERATIONAL IMPACT IS EXECUTED

BACKGROUND OF THE INVENTION

1. Field of the Invention

The present invention relates to data processing apparatuses which perform register renaming.

2. Description of the Prior Art

It is known to provide a data processing apparatus which executes data processing instructions which reference program model (i.e. logical) registers whilst the data processing apparatus itself stores the data values which are subjected to those data processing operations in a set of physical registers. Rather than maintaining a fixed mapping between the program model registers and the physical registers it is known to carry out a technique known as register renaming in which the mapping between program model registers and physical registers is varied and updated.

The register renaming may be performed for predominately performance related reasons, such as to allow parallelism in the execution of data processing instructions, for example when data processing instructions in a sequence are executed either in parallel or at least out of order and register renaming techniques are then used to maintain different versions of a given program model register, such that those data processing instructions may be executed in this parallel or out-of-order fashion without data hazards occurring. Whilst register renaming is advantageous in terms of the performance benefits it can bring, the additional hardware which must be provided in a data processing apparatus to allow such register renaming to occur is a disadvantage due to the cost and complexity which it introduces. This drawback makes the opportunities to use register renaming techniques in relatively small low-cost, low-power devices particularly limited.

Register renaming is also known as a valuable technique in the context of security sensitive devices because of the manner in which this technique makes it more difficult for an attacker to externally derive information about the internal operation of such a data processing apparatus, for example by fine-grained observation of the power consumption of the device or by invasive techniques which seek to introduce values into particular registers in order to observe the effect this has on the operation of the device. Whilst it would be desirable to allow the benefits of register renaming to be applied to such security sensitive devices, such devices are often constructed as small, low-cost, low-power devices and hence the additional architectural requirements associated with typical register renaming techniques have traditionally limited the opportunities for applying register renaming techniques in this context. For example, many known register renaming techniques require the number of physical registers to exceed the number of program model registers in order to enable those register renaming techniques to operate, and hence for any particular design of device, more physical registers would be required to support register renaming than would be required if register renaming was not used. In small devices, such as a small secure microprocessor, the size of the register file containing the physical registers is significant, and the resultant increase in the size of the register file required often precludes use of many register renaming techniques within such devices.

The paper "Instruction Stream Mutation for Non-Deterministic Processors", Irwin, Page and Smart, Proceedings of the IEEE International Conference on Application-Specific Systems, Architectures, and Processors (ASAP'02), 2002, describes various techniques that can be used to guard against differential power analysis (DPA) security attacks, one of the techniques involving a register renaming technique (referred to the article as register remapping) that uses a "liveness table" to control register renaming. In accordance with this technique, the number of physical registers does not need to exceed the number of program model registers, but extra instructions have to be added into the instruction flow to produce the information required to maintain the liveness table. Accordingly such an approach will require modification to the code executing on the device, and will have a significant impact on performance due to the need to execute those additional instructions.

It would be desirable to provide an improved technique for allowing the benefits of register renaming to be applied to data processing apparatuses, in particular in the context of small, low cost, low power devices, which alleviates the additional hardware requirement associated with many register renaming techniques.

SUMMARY OF THE INVENTION

Viewed from a first aspect, the present invention provides a data processing apparatus a data processing apparatus comprising:

a processor unit configured to perform data processing operations in response to data processing instructions, said data processing instructions referencing program model registers;

a set of physical registers configured to store data values which are subjected to said data processing operations;

a tag storage unit configured to store for each physical register a tag value indicative of one of said program model registers, said processor unit configured to reference said tag storage unit in order to perform said data processing operations and said tag storage unit providing a one-to-one mapping between said program model registers and said physical registers; and a tag value exchanger configured to perform a tag switch to exchange two tag values in said tag storage unit, wherein said tag value exchanger is configured to perform said tag switch when said processor unit executes a predetermined data processing instruction, wherein said predetermined data processing instruction references two program model registers and for which a choice of which two physical registers are mapped to which of said two program model registers will have no effect on an outcome of said data processing operations, and said tag value exchanger is configured to perform said tag switch with respect to the tag values indicative of said two program model registers.

The data processing apparatus has a processing unit which performs data processing operations in response to data processing instructions. Where these data processing instructions refer to registers, the instructions are written in terms of program model registers, i.e. a logical or virtual set of registers. The data processing apparatus has a set of physical registers in which the data values operated on by the data processing operations are physically stored. A tag storage unit associated with the set of physical registers stores a tag value for each physical register indicating which program model register maps to that physical register (and equally indicating which physical register maps to which program model register). There is a one-to-one mapping between model registers and physical registers.

The data processing apparatus further comprises a tag value exchanger which is configured to exchange two tag values in the tag storage unit, i.e. to switch the mappings between two program model register/physical model register pairs. The tag value exchanger performs this tag switch when the processor unit executes a particular kind of data processing instruction, this data processing instruction being one (or more) data processing instruction which form a subset of the full set of data processing instructions which the data processing apparatus can execute. Specifically, the predetermined data processing instruction for which the tag value exchanger performs this tag switch is an instruction for which it can be determined that the data processing instruction references two program model registers and the choice of mapping from two physical registers to those two program model registers is arbitrary in the sense that it will not have an effect on the outcome of the data processing operations. To take an example if the data processing instruction references program model registers A and B, which are to be mapped to physical registers X and Y, the data processing instruction is a "predetermined data processing instruction", i.e. the tag value exchanger will perform the tag switch when that instruction is executed, if it is determined that it will have no effect on the outcome of the data processing operations if the mappings A-X/B-Y or the mappings A-Y/B-X are used. In this situation the tag switch is performed with respect to the two program model registers referenced by the predetermined data processing instruction.

The tag storage unit associated with the physical registers is particularly simple because a one-to-one mapping is provided between program model registers and the physical registers. Accordingly, the complexities associated with tracking the status of registers, such as via the use of a "liveness table" or a "free table" is avoided here. Furthermore, the one-to-one mapping between program model registers and physical registers means that the set of physical registers is smaller than would be the case (commonly associated with prior art register renaming techniques) where the number of physical registers exceeds the number of program model registers. This is of particular advantage in the context of a small secure microprocessor.

Nevertheless, the advantage of being able to perform some register renaming, in particular due to the enhanced defence that this brings in the context of security sensitive devices, has nonetheless been achieved by the identification of a particular type of data processing instruction for which a variety of register renaming can be carried out, namely the above-mentioned "tag switch" in which two tag values in the tag storage unit are simply exchanged. The inventor of the present invention realised that such an operation could be performed for data processing instructions which reference two program model registers, and in which the choice of which physical registers are mapped to which of those two program model registers will not affect the outcome of the data processing operations being carried out by the data processing operation. Accordingly, for such data processing instructions the tag value exchanger performs this tag switch, thus performing some register renaming and thus improving the obfuscation of the data processing operations being carried out by this data processing apparatus.

In one embodiment execution of said predetermined data processing instruction comprises a write operation with respect to one of said two program model registers, said processor unit is configured to perform said write operation in a same processing cycle that said tag value exchanger performs said tag switch, and said processor unit is configured to perform said write operation with respect to a target physical register which will be mapped to said one of said two program model registers after said tag switch.

Accordingly, in this embodiment the processor unit performs the write operation of the predetermined data processing instruction in the same processing cycle that the tag switch takes place. In the knowledge that the tag switch will simultaneously take place, the processor unit carries out the write operation which forms part of the predetermined data processing operation with respect to the mapping of the program model registers to physical registers which will result after the tag switch. This modification of the manner in which the write operation of the predetermined data processing operation is carried out enables the correspondence between program model registers and the content of the physical registers to be maintained despite the tag switch being carried out. This may not be necessary for all predetermined data processing instructions for which the tag switch is carried out, but for some instructions, for example a load multiple instruction which loads the content of a sequence of memory addresses into sequence of physical registers associated with a sequence of program model registers, this is desirable, because it enables the sequence of operations to be carried out in a coordinated way, where the tag switch for a first operation does not adversely interfere with the tag switch for a next operation.

There may be a number of reasons why the choice of which two physical registers are mapped to the two program model registers will have no effect on the outcome of the data processing operations, but in one embodiment execution of said predetermined data processing instruction results in a same value being stored in said two physical registers mapped to said two program model registers. Accordingly, because the same value has been stored in the two physical registers, it does not matter which program model register points to which physical register. There may be a number of reasons why the same value ends up being stored in the two physical registers, but in one embodiment said predetermined data processing instruction is configured to copy a value stored in a first of said two physical registers to a second of said two physical registers which of course results in the same value being stored in the two physical registers.

In one embodiment, execution of said predetermined data processing instruction results in a new value being stored in each of said two physical registers mapped to said two program model registers, said new value being independent of a previous value stored in each of said two physical registers. The fact that a new value is being stored in each of the two physical registers means that the choice of mapping between the two program model registers and the two physical registers can be freely made, since the old content of both physical registers is simply overwritten.

A new value being stored in each of the two physical registers could occur for a number of reasons, but in one embodiment said predetermined data processing instruction is configured to copy at least one value stored in memory into said two physical registers. In one embodiment said predetermined data processing instruction is configured to copy two values stored in memory into said two physical registers. Whether one value from memory is stored into both physical registers or two values are stored into the two physical registers, the fact that new values are being stored to both physical registers means that the mapping choice in unconstrained.

It should be appreciated that the present technique is not limited to instances in which only two program model registers are referenced by the predetermined data processing instruction and in some embodiments said predetermined data processing instruction references a plurality of program model registers and for which a choice of which plurality of physical registers are mapped to which of said plurality of program model registers will have no effect on an outcome of said data processing operations, wherein said plurality is greater than two.

The predetermined data processing instruction may be relatively simple in that it can be executed in a single data processing cycle, but some predetermined data processing instructions may be more complicated and execute over several data processing cycles. In one such embodiment said processor unit is configured to execute said predetermined data processing instruction over successive data processing cycles and said tag value exchanger is configured to perform said tag switch with respect to tag values stored for said two physical registers which are respectively operated on in a current data processing cycle and a next data processing cycle. Accordingly, the data processing apparatus can take advantage of the fact that it is known that these two physical registers will be operated on in this data processing cycle and the next data processing cycle and therefore can perform the tag switch for the tag values stored in association with those two physical registers without risk of a data hazard occurring. Accordingly, the operations carried out in the successive data processing cycles can be linked in terms of the tag switches being carried out. This is advantageous for example when only a single write operation and tag switch can be carried out in any given data processing cycle.

In some embodiments, said tag value exchanger is configured to perform said tag switch for said two tag values in said tag storage unit, wherein said two tag values are stored for the same physical register. In other words given that there is a one-to-one mapping between tag values and physical registers, this means that the "two" tag values that are switched are in fact one and the same. Whilst it will be recognised that applying the tag switch in this manner to tag values stored for the same physical register, i.e. to the same tag value, will have no net effect, this additional "dummy" register renaming operation may be advantageous because of the additional level of obfuscation which it brings to the data processing apparatus.

Whilst the tag value exchanger could be configured to perform the tag switch every time such a predetermined data processing instruction is encountered, in some embodiments said data processing apparatus is configured to selectively suppress performance of said tag switch by said tag value exchanger. In the context of a security-sensitive device the ability to selectively suppress the tag switch, in other words the register renaming operation, can be advantageous because of the additional control over the obfuscation associated with renaming process that this brings.

The selective suppression of the tag switch may be controlled in a number of ways, whether on the basis of an internal or external stimulus, but in one embodiment said data processing apparatus is configured to selectively suppress performance of said tag switch by said tag value exchanger on a dynamic basis. For example, the tag switching could simply be turned off under certain operating conditions, for certain time periods, in certain operating modes and so on. Accordingly by allowing the selected suppression of the performance of the tag switch on an on-going basis whilst the data processing apparatus is carrying out its data processing operations an additional level of defence against attacks which seek to monitor the power consumption of the device over time is enabled.

In one embodiment said data processing apparatus is configured to selectively suppress performance of said tag switch by said tag value exchanger on a randomized (e.g. pseudo-random) basis. Introducing such a randomized basis for the suppression is particularly advantageous in the context of devices which employ this technique in a security context because of the additional level of defence against attacks which seek to derive information about the data processing operations as been carried out on the basis of statistically observations. The randomized basis of the suppression disrupts such statistical observations.

It may also be advantageous to suppress performance of the tag switch when particular types of register are referenced by the predetermined data processing instruction. For example in one embodiment said data processing apparatus is configured to selectively suppress performance of said tag switch by said tag value exchanger involving a program counter register. In another embodiment said data processing apparatus is configured to selectively suppress performance of said tag switch by said tag value exchanger involving a stack pointer register. Whilst some embodiments may allow tag switching to occur with respect to program counter or stack pointer registers, the suppression of the tag switching for these types of registers can bring architectural simplicity to the data processing apparatus.

Viewed from a second aspect the present invention provides a data processing apparatus comprising:

processor means for performing data processing operations in response to data processing instructions, said data processing instructions referencing program model register means;

physical register means for storing data values which are subjected to said data processing operations;

tag storage means for storing for each physical register means a tag value indicative of one of said program model register means, said processor means referencing said tag storage means in order to perform said data processing operations and said tag storage means providing a one-to-one mapping between said program model register means and said physical register means; and tag value exchange means for performing a tag switch to exchange two tag values in said tag storage means, said tag value exchange means for performing said tag switch when said processor means executes a predetermined data processing instruction, wherein said predetermined data processing instruction references two program model registers and for which a choice of which two physical registers are mapped to which of said two program model registers will have no effect on an outcome of said data processing operations, and said tag value exchange means for performing said tag switch with respect to the tag values indicative of said two program model registers.

Viewed from a third aspect the present invention provides a method of data processing comprising:

performing data processing operations in response to data processing instructions, said data processing instructions referencing program model registers;

storing data values in a set of physical registers which are subjected to said data processing operations;

in a tag storage unit, storing for each physical register a tag value indicative of one of said program model registers, and referencing said tag storage unit in order to perform said data processing operations and providing in said tag storage unit a one-to-one mapping between said program model registers and said physical registers; and performing a tag switch to exchange two tag values in said tag storage unit, wherein said tag switch is performed when a predetermined data processing instruction is executed, wherein said predetermined data processing instruction references two program model registers and for which a choice of which two physical registers are mapped to which of said two program model registers will have no effect on an outcome of said data processing operations, and said tag switch is performed with respect to the tag values indicative of said two program model registers.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
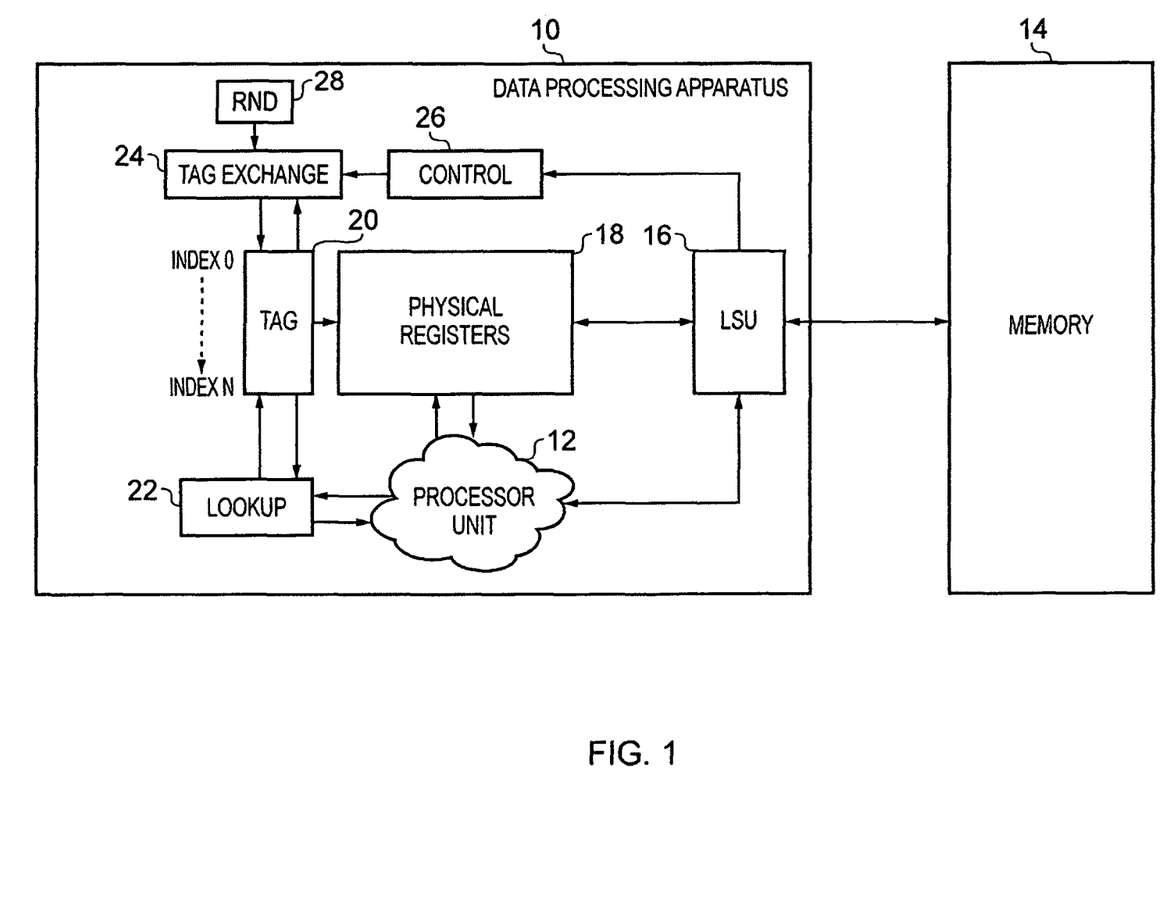
FIG. 1 is schematically illustrates a data processing apparatus and memory in accordance with one embodiment.

FIG. 1 schematically illustrates a data processing apparatus in accordance with one embodiment. It will be appreciated that data processing apparatus 10 is only presented here in terms of a relatively high level schematic sufficient for the purposes of discussing the techniques presented herein and the skilled person will be familiar with many other components of such a data processing apparatus which will typically be implemented, but are omitted here for clarity of illustration and discussion. The data processing apparatus 10 comprises a processor unit 12 which is configured to perform data processing operations in response to a sequence of data processing instructions. These data processing instructions will generally be stored in memory 14 which the data processing apparatus 10 accesses by means of the load store unit (LSU) 16. The processor unit 12 carries out the data processing operations in response to the data processing instructions by accessing (reading from and storing to) data values held in a set of physical registers 18. The processor unit 12 does not reference the physical registers directly, but rather with reference to a virtual set of program model registers. The data processing instructions are written with reference to these program model registers. The correspondence between the physical registers and the program model registers is defined by the contents of the tag storage unit 20, which holds a tag value associated with each physical register indicative of one of the program model registers. The mapping between physical registers and program model registers is one-to-one, i.e. each physical register is only referenced by one program model register and each program model register only references one physical register. The translation between program model registers and physical registers is administered for the processor unit 12 by the lookup unit 22 which is configured to perform a lookup operation in the tag storage unit 20 to determine which physical register is associated with a given program model register. Hence, the processor unit 12 can pass a value indicating a program model register to the lookup unit 22, which can then indicate (for example by means of an index) which physical register corresponds to that program model register. This lookup procedure is described in more detail below with reference to FIG. 2B. The processor unit 12 can then read from or write to the appropriate physical register which corresponds to the program model register it currently wishes to access.

The data processing apparatus 10 also comprises a tag exchange unit 24 ("tag value exchanger") which is configured to perform a tag switch to exchange two tag values in the tag storage unit 20. The tag exchanger 24 is operated under control of control unit 26 which determines when this tag switch should take place and with respect to which to tag values. In particular, the control unit 26 instructs the tag exchange unit 24 to perform the tag switch when the processor unit 12 executes a particular kind of data processing instruction. The identification of this particular kind of data processing instruction to the control unit 26 is schematically illustrated in FIG. 1 by the path from LSU 16 to control unit 26 but it will be appreciated that this information may come from a number of sources, for example from a decode unit which receives loaded instructions from the LSU and decodes them in to appropriate control signals for use within the data processing apparatus. The data processing instructions for which the tag switch is carried out are those that reference two program model registers and for which it is recognised that a choice of which two physical registers are mapped to which of the two program model registers will have no effect on the outcome of the data processing operations of the data processing apparatus. Examples of these instructions will be discussed in more detail in the following.

In addition, the control unit 26 can suppress the performance of the tag switch by the tag value exchanger 24 even if one of the particular kind of data processing instructions is being executed by the processor unit 12. This control over the performance of the tag switch is particularly beneficial in the context of a security sensitive data processing apparatus since it gives the data processing apparatus an additional control parameter by means of which its power signature can be altered and the use of the physical registers 18 can be further disguised. The control unit 26 can suppress performance of the tag switch in a number of ways, for example when the data processing apparatus is in a particular mode of operation, in which the enhanced security provided by the present technique is not required. The data processing apparatus 10 can further comprise a pseudo-random number generator 28 configured to provide an enable signal to the tag exchange unit 24 such that the tag switch will only be performed if the enable signal is provided. Accordingly, the tag switch may be pseudo-randomly applied to the tag unit 20 when the predetermined type of data processing instruction to which this technique is applied is executed by the processor unit 12. This further helps to disguise the data processing operations being carried out by the data processing apparatus.

Figure 2A:
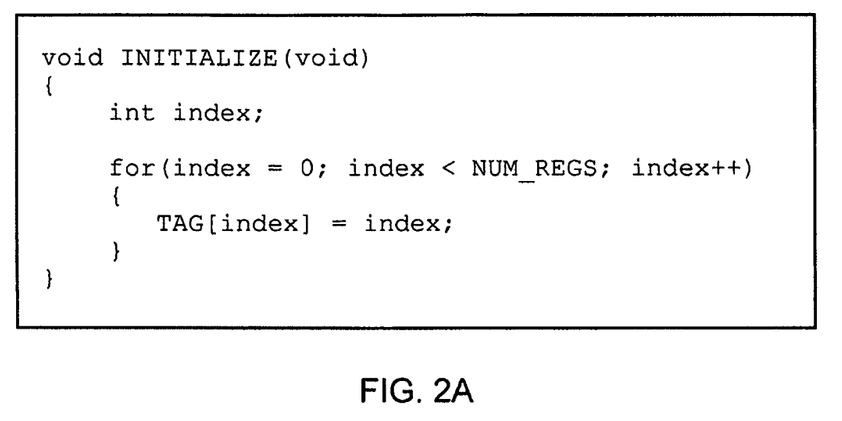
FIG. 2A illustrates in hardware description language how the initialisation of the contents of the tag storage unit may be carried out in one embodiment.

The mapping between the program model registers and the physical registers is one-to-one. In order to initialise this set up, a procedure such as that illustrated by the INITIALIZE function shown in terms of hardware description language in FIG. 2A may be carried out. This function results in the contents of the tag unit 20 corresponding directly to the index of each entry (from 0 to the number of physical registers NUM_REGS).

Figure 2B:
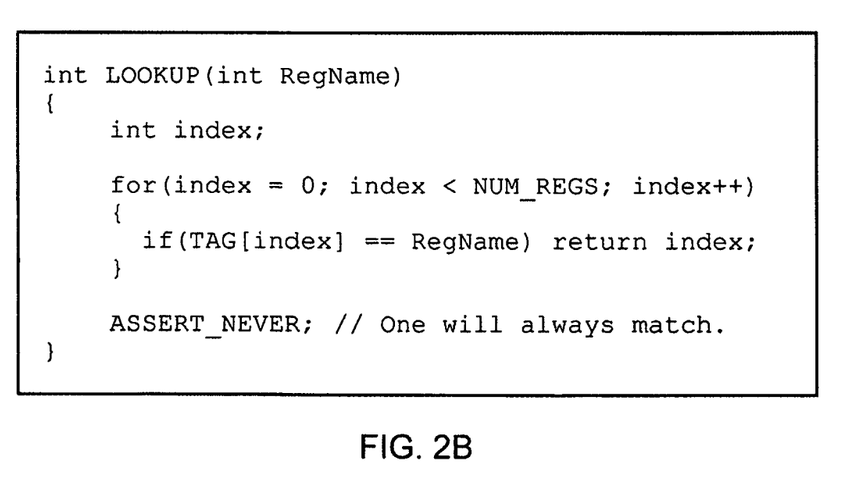
FIG. 2B schematically illustrates in hardware description language how a lookup procedure in the tag storage unit may be carried out in one embodiment.

The lookup procedure carried out by lookup units 22 is illustrated by the function LOOKUP shown in terms of hardware description language in FIG. 2B. This function is passed the name (i.e. the number) of a program model register RegName for which the mapped physical register is sought. The function cycles through the indices of the tag unit 20 and returns the index where RegName is found. Accordingly, the processor unit 12 can perform data processing operations on the contents of the physical registers 18 by reference to the program model registers by means of the LOOKUP function.

Figure 3A:
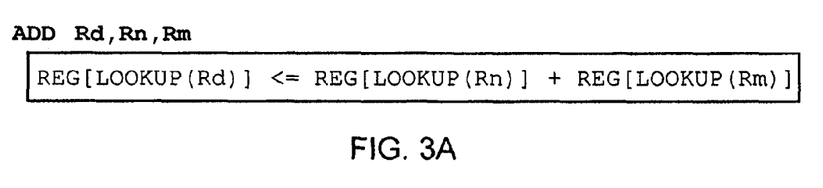
FIGS. 3A and 3B schematically illustrate in hardware description language how ADD and MOV instructions may be respectively implemented in one embodiment.

FIG. 3A illustrates how the LOOKUP function is incorporated into the implementation of a data processing instruction which is not one of those instructions for which the tag switch is performed. In this example an ADD instruction is considered. In this description the example instructions given form part of the ARM instruction set provided by ARM Limited, Cambridge, UK, but the invention is not limited to such instructions. In the program model syntax reference is made to registers Rd, Rn and Rm, the syntax being such that the "content" of registers Rn and Rm are added together and stored in register Rd. Accordingly, the LOOKUP function is used to translate Rn and Rm into the corresponding indices in the physical registers given by referencing tag unit 20 and these are then used in the function REG[index], which accesses the physical registers 18. Thus the content of the physical register corresponding to program model register Rn is added to the content of the physical register corresponding to the program model register Rm and this sum is stored in the physical register corresponding to the program model register Rd. There is no flexibility in the allocation between program model registers and physical model registers in the implementation of this ADD instruction and therefore it does not form one of the predetermined data processing instructions for which the tag switch of the present technique is applied. Note that not performing any register renaming for this instruction is in contrast to a traditional renaming scheme in which the write to Rd would typically cause Rd to be allocated to a new physical register via a new allocation in the tagging scheme. However the allocation of new physical registers requires additional hardware and complexity which (with the aim of providing a low-cost low-power data processing apparatus) is not performed here.

Figure 3B:
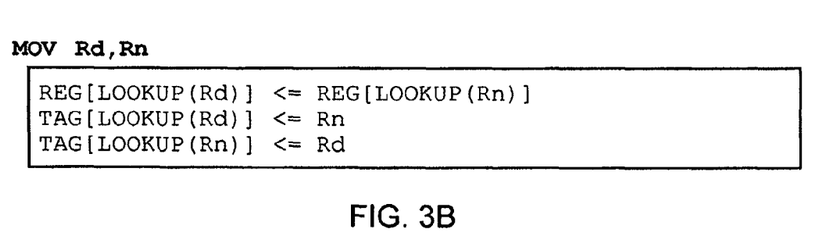

By contrast, the tag switch can be used in the context of a MOV instruction as is illustrated in hardware description language in FIG. 3B. In this example, the content of the physical register associated with program model register Rn is copied into the physical register associated with the program model register Rd. Because Rd and Rn (or more accurately their corresponding physical registers) will contain identical values after this operation completes this instruction is identified as one of the predetermined data processing instructions to which the present technique of tag switching is applied. Accordingly, the implementation of the MOV instruction shown in FIG. 3B (all three lines of which complete in a single cycle) copies the content of the physical register found by looking up the program model register Rn into the physical register found by looking up the program model register Rd respectively. At the same time the entries in the tag unit 20 corresponding to Rn and Rd are switched by the tag exchange unit 24. This has no perceivable impact on the outcome of the data processing operation being performed by the data processing apparatus which has executed this instruction, but the swapping of the tags is advantageous in seeking to hide from an external attacker what data processing operations are being carried out by the data processing apparatus.

Figure 4:
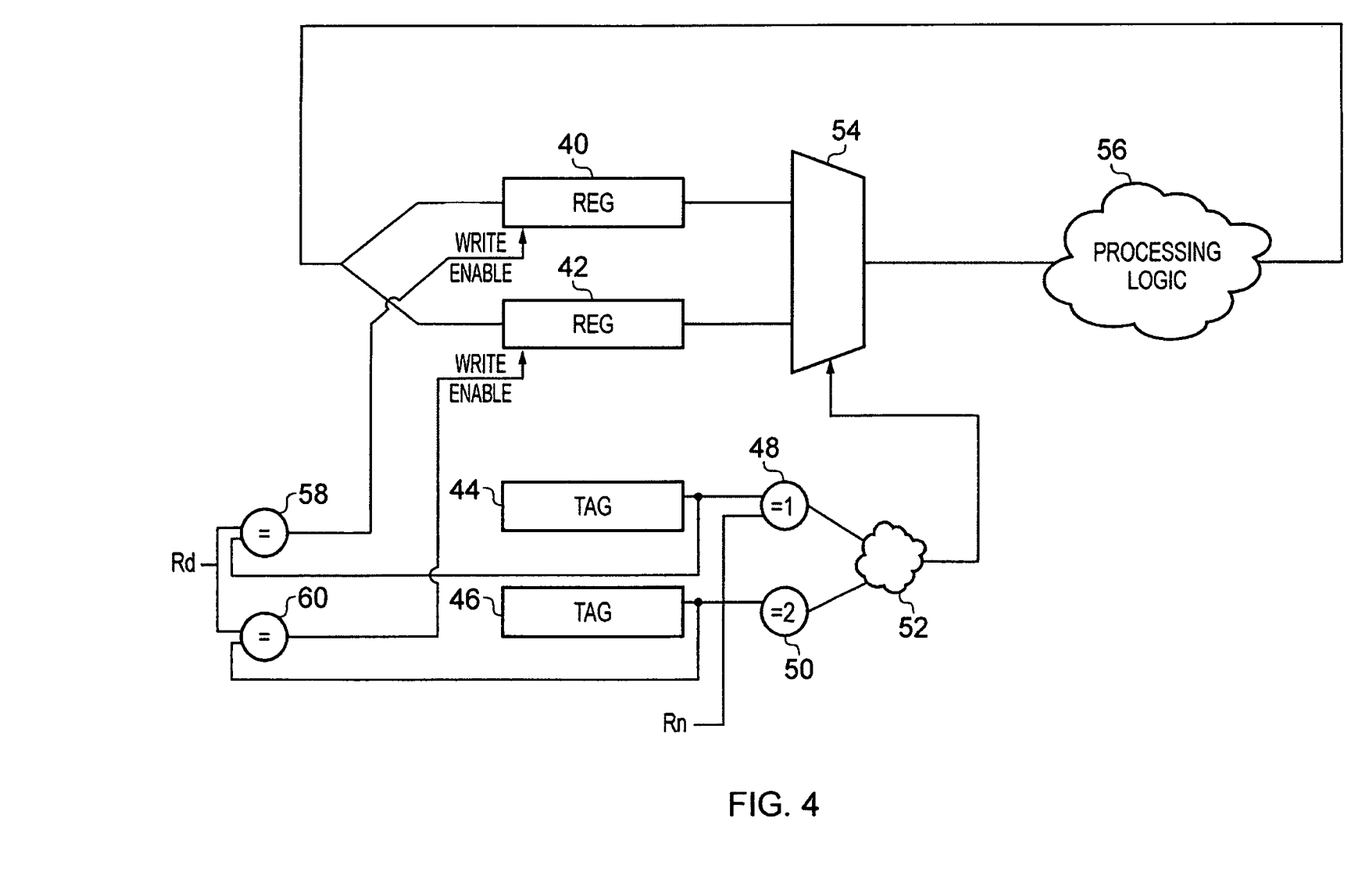
FIG. 4 schematically illustrates some of the architectural components which may be provided to implement a MOV instruction in one embodiment.

FIG. 4 schematically illustrates a simple "circuit-style" implementation of the MOV instruction discussed with respect to FIG. 3B. For simplicity of illustration only two physical registers 40 and 42 are illustrated together with their respectively associated tag unit entries 44 and 46. Accordingly, there are only two possible physical registers to which the program model registers can refer in this simplified example, which are also called "1" and "2". The source register Rn is compared to the content of tag entries 44 and 46 by comparators 48 and 50 which determine whether the first or second register (i.e. register 40 or register 42) is mapped to by this program model register. The output of comparators 48 and 50 provides the steering input to multiplexer 54 (possibly via some kind of translation logic 52 which can format the signal appropriately). Thus selected the values stored in one of registers 40 and 42 is passed via multiplexer 54 to processing logic 56. In this simple example of a MOV instruction the content value is simply being copied and in fact no processing on this value needs to be performed in processing logic 56. The value is then passed back to the physical registers 40 and 42. Write enable signals to the registers 40 and 42 select one of the registers to be written to by this operation. The program model destination register Rd is compared by comparators 58 and 60 to the content of tag entries 44 and 46 to determine which physical register 40, 42 corresponds to program model register Rd. Hence, the content value read out of one of physical registers 40 and 42 is thereby written into one of the physical registers 40 and 42. Although it is logically possible for the content value to be written into the same physical register from which it was read out (i.e. Rd=Rn) in a more common use of the MOV instruction the content of one physical register (e.g. 40) is written into the other physical register (i.e. 42). However in the context of security sensitive data processing apparatuses the use of dummy instructions such as moving the content of a physical register back into itself may indeed occur, as part of various techniques to hide data processing operations being carried out.

Figure 5:
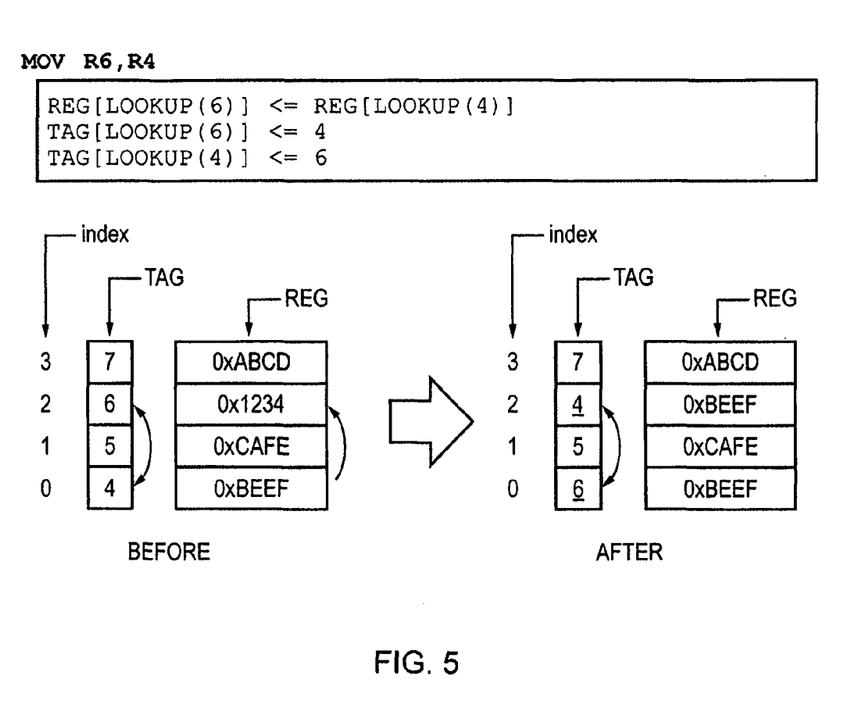
FIG. 5 schematically illustrates more detail of the implementation of an example MOV instruction in one embodiment.

FIG. 5 schematically illustrates a specific example of applying the present technique to a MOV instruction. Here the content of the physical register mapped to by program model register R6 should be made equal to the value stored in the physical register mapped to by the program model register R4. Accordingly, the hardware description language shown corresponds directly to that illustrated in FIG. 3B where Rd=R6 and Rn=R4. The lower half of FIG. 5 illustrates the content of an example set of tag and register entries before and after execution of this MOV instruction. Accordingly in the example shown MOV R6, R4 causes the content of REG[0] to be copied into REG[2]. Hence 0x1234 is overwritten by 0xBEEF. In addition, because this MOV instruction references two program model registers (namely R6 and R4) for which the choice of which of the two physical registers (i.e. REG[0] or REG[2]) are mapped to by which of these program model registers will have no effect on the outcome of the data processing operations, the tag value exchanger swaps the tag entries corresponding to R6 and R4. Accordingly the value in REG[0] remains the same but is renamed from being associated with R4 to being associated with R6 and the value written which would have targeted R6 has actually been placed into what is now mapped to R4. Accordingly subsequent operations will now use index 0 for R6 and index 2 for R4.

Figure 6A:
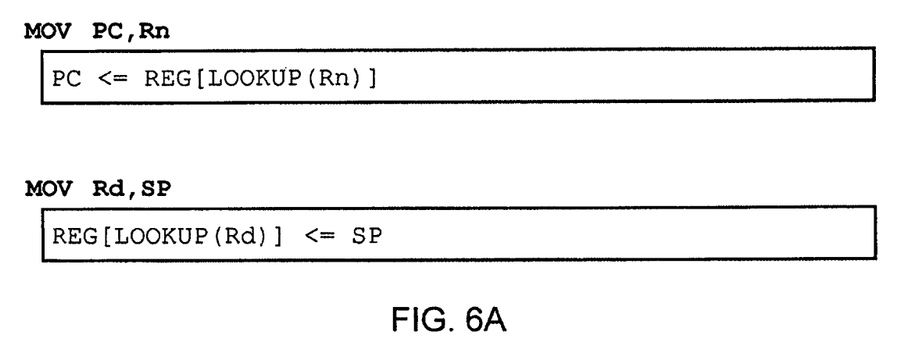
FIG. 6A schematically illustrates in hardware description language examples of two special types of register where tag switching is suppressed in one embodiment.

The above described register renaming (i.e. tag swapping) can in principle be applied to any instruction which references two program model registers and for which the choice of which two physical registers are mapped onto which of the two program model registers is free, but FIG. 6A illustrates an implementation in which the tag switch is suppressed when either the register holding the program counter or the register holding the stack pointer are referenced. Accordingly in the first example in FIG. 6A the content of the physical register mapped to by Rn is copied into the program counter register without any tag switching occurring and in the second example in FIG. 6A the stack pointer is copied into the physical register mapped to by program model register Rd without any tag switching occurring. Suppressing the tag switching for these particular registers simplifies the construction of the data processing apparatus since the program counter and stack pointer effectively have fixed mappings throughout the operation of the data processing apparatus and may therefore more easily be hardwired into architectural features of the data processing apparatus.

Figure 6B:
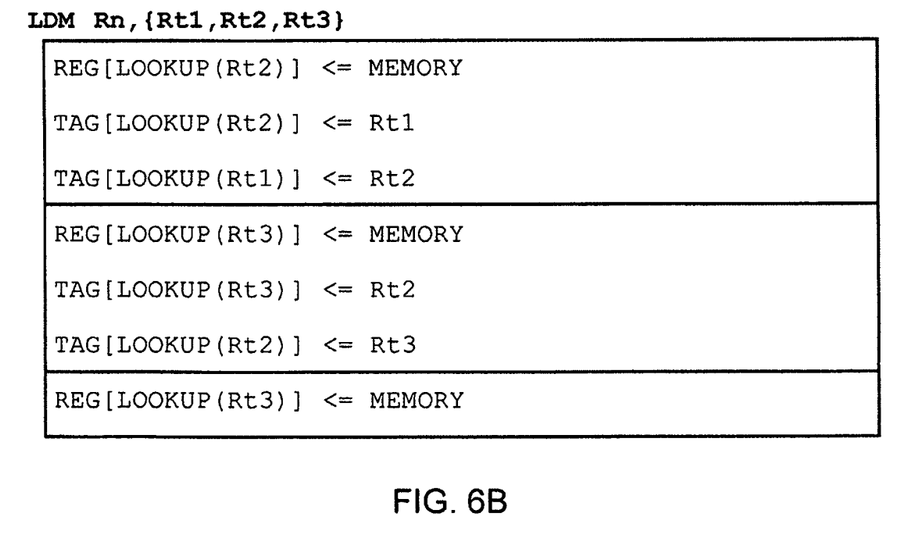
FIG. 6B schematically illustrates in hardware description language how an LDM instruction may be implemented in one embodiment.

In addition to cases where a register is cloned (as discussed above with respect to FIGS. 3B, 4 and 5 for the MOV instruction), other cases exist where the data processing instruction references two program model registers and the choice of which two physical registers are mapped on to which of those two program model registers will have no effect on the outcome of the data processing operations. One such example is the load multiple (LDM) instruction illustrated in FIG. 6B. The LDM instruction in FIG. 6B uses the content of a physical register mapped to by the program model register Rn as a starting memory address with reference to which memory values are copied into target registers Rt1, Rt2 and Rt3. Typically this is implemented as the value at memory address Rn being copied into Rt1, the value at memory address Rn+4 being copied into Rt2 and the value at the memory address Rn+8 being copied into Rt3. Due to the fact that all three target registers Rt1, Rt2 and Rt3 will have a new value stored in them from memory, the choice of how the corresponding three physical registers are mapped onto these three program model registers is arbitrary in the sense that it will have no effect on the outcome of the data processing operations. Accordingly, it is recognised here that the tags of any two registers being referenced which have not already been loaded may be exchanged. The tag exchanger is configured to perform one tag switch per cycle and accordingly the tags of any two registers referenced which have not already been loaded may be exchanged on a per-cycle basis. The implementation illustrated in FIG. 6B exchanges the tags for the register currently being loaded in a given cycle and the register to be loaded in the next cycle. Accordingly, instead of loading Rt1, then Rt2, then R3 in subsequent cycles, as illustrated in FIG. 6B first Rt2 is loaded and the tags of Rt2 and Rt1 are swapped. Then in the next cycle Rt3 is loaded and the tags of Rt2 and Rt3 are swapped. In the last cycle Rt3 is loaded. The net effect is that Rt3's new tag (and storage) is Rt1's old tag (and storage); Rt2's new tag (and storage) is Rt3's old tag (and storage) and Rt1's new tag (and storage) is Rt2's old tag (and storage).

Another example of an instruction which executes over several cycles to which the present techniques may be applied is a long multiply instruction. A similarly staged implementation of the per-cycle tag swapping discussed above with reference to the LDM instruction can be applied to the long multiply instruction.

Figure 7A:
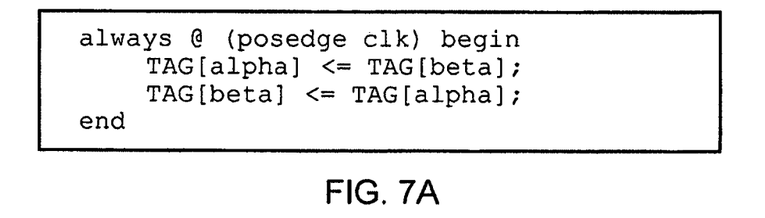
FIGS. 7A, 7B and 7C schematically illustrate example hardware description language which may be used to implement some features in one embodiment.

As mentioned above, in each cycle only one tag exchange is required and this can be simply implemented as illustrated by the hardware description language shown in FIG. 7A, wherein alpha and beta are the LOOKUPs for the two architectural registers to be exchanged.

Figure 7B:
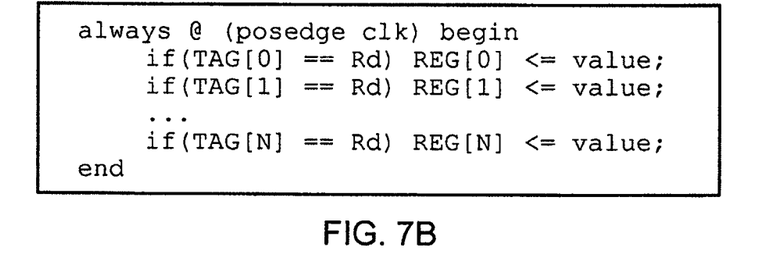
Figure 7C:
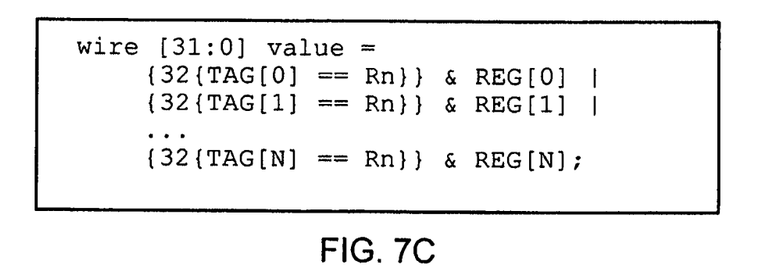

Writing to the physical registers can be implemented by hardware such as that described in FIG. 7B wherein the value to be written ("value") is written into the physical register REG which has the same index as the tag entry which matches the referenced program model register Rd. Conversely the read operation to be implemented for the physical registers can be implemented via the hardware described in FIG. 7C wherein only one of the statements "TAG[x]==Rn" will evaluate as TRUE, this generating a 32-bit select mask (i.e. 32 consecutive 1's) in order to generate as the output "value" the content of the physical register REG[x] for which the TAG[x] entry matched Rn.

Figure 8:
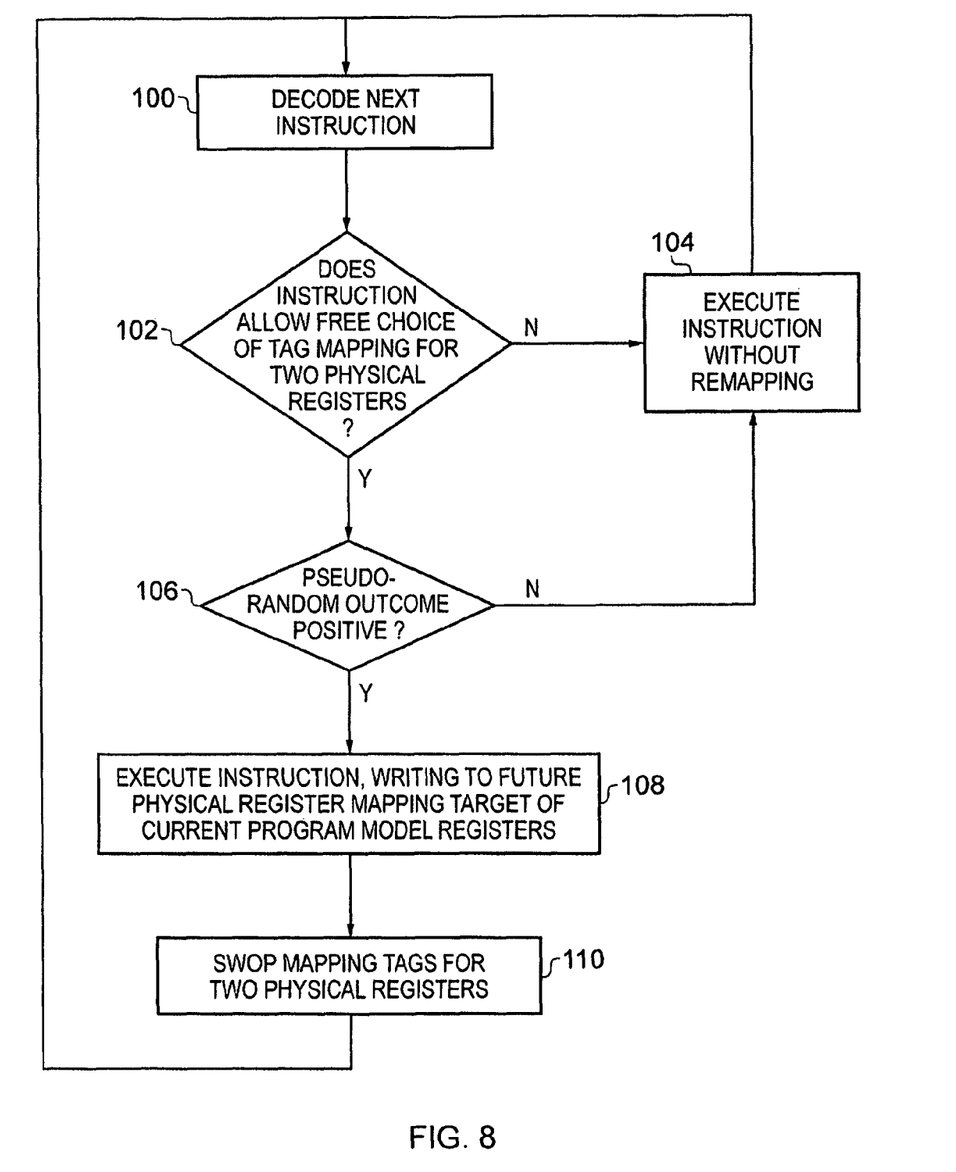
FIG. 8 schematically illustrates a series of steps which may be taken in one embodiment.

FIG. 8 schematically illustrates a series of steps which may be taken in one embodiment. At step 100 the next instruction in the sequence of data processing instructions to be executed is decoded within the data processing apparatus. At step 102 it is determined if this instruction is one of the subset of instructions which allow a free choice of tag mappings for its two physical registers, i.e. in the present context where in there is a one-to-one mapping between program model registers and physical registers, the instruction references two program model registers but the tag mapping between the two physical registers and the two program model registers will have no effect on the outcome of the data processing operations. If this instruction is not such an instruction than the flow proceeds to step 104 where the instruction is executed normally without any remapping being performed and the flow then returns to step 100 for the next instruction to be decoded. If however the decoded instruction is determined at step 102 to be one of the predetermined set of data processing instructions which does allow this free choice of tag mapping then the flow proceeds to step 106. Here reference is made to a pseudo-random source within the data processing apparatus which generates a positive or negative response on a pseudo-random basis. If the outcome of this pseudo-random source is at this instance negative then the flow returns to step 104 and the instruction is executed normally without any remapping. However if the outcome of the pseudo-random test is positive then the flow proceeds to step 108 wherein the instruction is executed but writing to the future physical register mapping target of the current program model registers and at step 110 the tag values which map the two physical registers are swapped in the tag unit. The flow then returns to step 100 for the next instruction to be decoded. It should be noted that although steps 108 and 110 are described as separate steps here, these steps take place in a single processing cycle i.e. are effectively simultaneous.

It should be noted that writing to the future physical register mapping target of the current program registers (at step 108) is an action which can be dropped in an optimized implementation of some instructions. For example in the case of implementing the MOV instruction discussed above with respect to FIG. 5, this "writing to the future physical register mapping target of the current program registers" could be implemented by writing 0xBEEF into REG[0] (i.e. the future physical register mapping target of R6). However, since it is known that this physical register has provided the source content for the MOV, this step can be dropped as an optimization. In that case the only write operation performed is the writing of 0xBEEF into REG[2] (as the realisation of REG[LOOKUP(6)]<=REG[LOOKUP(4)]).

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing apparatus comprising:
  a processor unit configured to perform data processing operations in response to data processing instructions, said data processing instructions referencing program model registers;
  a set of physical registers configured to store data values which are subjected to said data processing operations;
  a tag storage unit configured to store for each physical register a tag value indicative of one of said program model registers, said processor unit configured to reference said tag storage unit in order to perform said data processing operations and said tag storage unit providing a one-to-one mapping between said program model registers and said physical registers; and
  a tag value exchanger configured to perform a tag switch to exchange two tag values in said tag storage unit,
  wherein said tag value exchanger is configured to perform said tag switch when said processor unit executes a predetermined data processing instruction,
  wherein said predetermined data processing instruction references two program model registers and for which a choice of which two physical registers are mapped to which of said two program model registers will have no effect on an outcome of said data processing operations, and said tag value exchanger is configured to perform said tag switch with respect to the tag values indicative of said two program model registers.

2. A data processing apparatus as claimed in claim 1, wherein execution of said predetermined data processing instruction comprises a write operation with respect to one of said two program model registers,
  wherein said processor unit is configured to perform said write operation in a same processing cycle that said tag value exchanger performs said tag switch,
  and wherein said processor unit is configured to perform said write operation with respect to a target physical register which will be mapped to said one of said two program model registers after said tag switch.

3. A data processing apparatus as claimed in claim 1, wherein execution of said predetermined data processing instruction results in a same value being stored in said two physical registers mapped to said two program model registers.

4. A data processing apparatus as claimed in claim 3, wherein said predetermined data processing instruction is configured to copy a value stored in a first of said two physical registers to a second of said two physical registers.

5. A data processing apparatus as claimed in claim 1, wherein execution of said predetermined data processing instruction results in a new value being stored in each of said two physical registers mapped to said two program model registers, said new value being independent of a previous value stored in each of said two physical registers.

6. A data processing apparatus as claimed in claim 5, wherein said predetermined data processing instruction is configured to copy at least one value stored in memory into said two physical registers.

7. A data processing apparatus as claimed in claim 5, wherein said predetermined data processing instruction is configured to copy two values stored in memory into said two physical registers.

8. A data processing apparatus as claimed in claim 1, wherein said predetermined data processing instruction references a plurality of program model registers and for which a choice of which plurality of physical registers are mapped to which of said plurality of program model registers will have no effect on an outcome of said data processing operations, wherein said plurality is greater than two.

9. A data processing apparatus as claimed in claim 1, wherein said processor unit is configured to execute said predetermined data processing instruction over successive data processing cycles and said tag value exchanger is configured to perform said tag switch with respect to tag values stored for said two physical registers which are respectively operated on in a current data processing cycle and a next data processing cycle.

10. A data processing apparatus as claimed in claim 1, wherein said tag value exchanger is configured to perform said tag switch for said two tag values in said tag storage unit, wherein said two tag values are stored for the same physical register.

11. A data processing apparatus as claimed in claim 1, wherein said data processing apparatus is configured to selectively suppress performance of said tag switch by said tag value exchanger.

12. A data processing apparatus as claimed in claim 10, wherein said data processing apparatus is configured to selectively suppress performance of said tag switch by said tag value exchanger on a dynamic basis.

13. A data processing apparatus as claimed in claim 10, wherein said data processing apparatus is configured to selectively suppress performance of said tag switch by said tag value exchanger on a pseudo-random basis.

14. A data processing apparatus as claimed in claim 10, wherein said data processing apparatus is configured to selectively suppress performance of said tag switch by said tag value exchanger involving a program counter register.

15. A data processing apparatus as claimed in claim 10, wherein said data processing apparatus is configured to selectively suppress performance of said tag switch by said tag value exchanger involving a stack pointer register.

16. A data processing apparatus comprising:
  processor means for performing data processing operations in response to data processing instructions, said data processing instructions referencing program model register means;
  physical register means for storing data values which are subjected to said data processing operations;
  tag storage means for storing for each physical register means a tag value indicative of one of said program model register means, said processor means referencing said tag storage means in order to perform said data processing operations and said tag storage means providing a one-to-one mapping between said program model register means and said physical register means; and
  tag value exchange means for performing a tag switch to exchange two tag values in said tag storage means, said tag value exchange means for performing said tag switch when said processor means executes a predetermined data processing instruction,
wherein said predetermined data processing instruction references two program model registers and for which a choice of which two physical registers are mapped to which of said two program model registers will have no effect on an outcome of said data processing operations,
and said tag value exchange means for performing said tag switch with respect to the tag values indicative of said two program model registers.

17. A method of data processing comprising:

performing data processing operations in response to data processing instructions, said data processing instructions referencing program model registers;

storing data values in a set of physical registers which are subjected to said data processing operations;

in a tag storage unit, storing for each physical register a tag value indicative of one of said program model registers, and referencing said tag storage unit in order to perform said data processing operations and providing in said tag storage unit a one-to-one mapping between said program model registers and said physical registers; and performing a tag switch to exchange two tag values in said tag storage unit, wherein said tag switch is performed when a predetermined data processing instruction is executed, wherein said predetermined data processing instruction references two program model registers and for which a choice of which two physical registers are mapped to which of said two program model registers will have no effect on an outcome of said data processing operations, and said tag switch is performed with respect to the tag values indicative of said two program model registers.

* * * * *